INVENTOR.
SIGURD D. HAGE
BY
AGENT

United States Patent Office

3,195,349
Patented July 20, 1965

3,195,349
METHOD AND APPARATUS FOR DETERMINING THE AVAILABLE POWER OUTPUT OF AN ENGINE
Sigurd D. Hage, Seattle, Wash., assignor to The Boeing Company, Seattle, Wash., a corporation of Washington
Filed Jan. 7, 1963, Ser. No. 249,728
5 Claims. (Cl. 73—116)

This invention relates to a device to determine the available power output of an engine, and more particularly to determining the percentage of total power available for the lifting of a helicopter under any existing atmospheric and loading conditions.

The power output of an engine varies greatly with ambient atmospheric conditions. For example, when operated at sea level and at low ambient temperatures, the maximum power output available from any given engine is greater than that attainable when the same engine is operated at high altitudes and at higher ambient temperatures.

This invention provides a method and means which determines the maximum power available from a split-shaft gas turbine engine by comparing the maximum r.p.m. of the gas producer section (first stage rotor speed) at a known load to the minimum r.p.m. of that section necessary to drive the same known load. With these three values known, a device incorporating the teachings of this invention will indicate the additional load that the engine can drive in terms of percent of the known load. The maximum power available from a split-shaft turbine engine when used to drive a helicopter may be related to maximum lifting force of the helicopter in pounds. Thus under any operating conditions the lifting capability of a helicopter can be ascertained quickly and easily.

Although the description will be directed to the use of the invention in a helicopter powered by a split-shaft gas turbine engine, it will be readily seen that the invention may be used in other applications of engines such as a split-shaft turbine engine.

Therefore, an object of this invention is to provide a method and apparatus to indicate the available engine power under all engine operating conditions.

A further object of the invention is to provide a method and apparatus for quickly making known the maximum power available from a split-shaft gas turbine engine by relating a known power output of the engine to the gas producer speed for given atmospheric conditions.

Another object of the invention is to provide a method and apparatus to determine the percent of total available power being delivered by a split-shaft gas turbine engine at a given gas producer speed and under given atmospheric conditions.

Another object of the invention is to provide a method and apparatus to indicate the amount of load that can be lifted by a helicopter under any operating conditions.

Another object of the invention is to provide a method and apparatus to determine a value related to the power available in a split-shaft gas turbine engine, such as the pounds of lifting force of a helicopter powered by such an engine, by comparing this value to the gas producer speed of the engine.

These and other objects of the invention not specifically set forth above will become readily apparent from the accompanying description and drawings in which.

The description of the invention will be as follows: first, the operation of a typical split-shaft gas turbine engine and the characteristics of that engine under varying conditions of ambient pressure, temperature, and density; second, the characteristics of a helicopter powered by a split-shaft gas turbine engine and how these characteristics vary with the changes in the ambient temperature, pressure, and density; third, the embodiments of the invention and how it enables a person to determine rapidly the maximum lifting capacity of a split-shaft gas turbine powered helicopter under any operation conditions; and finally, the broader application of the invention which enables a person to determine not only the maximum power available in a split-shaft gas turbine engine, or the possible power output at a given producer speed, but also any value functionally related to power output.

Figure 1:
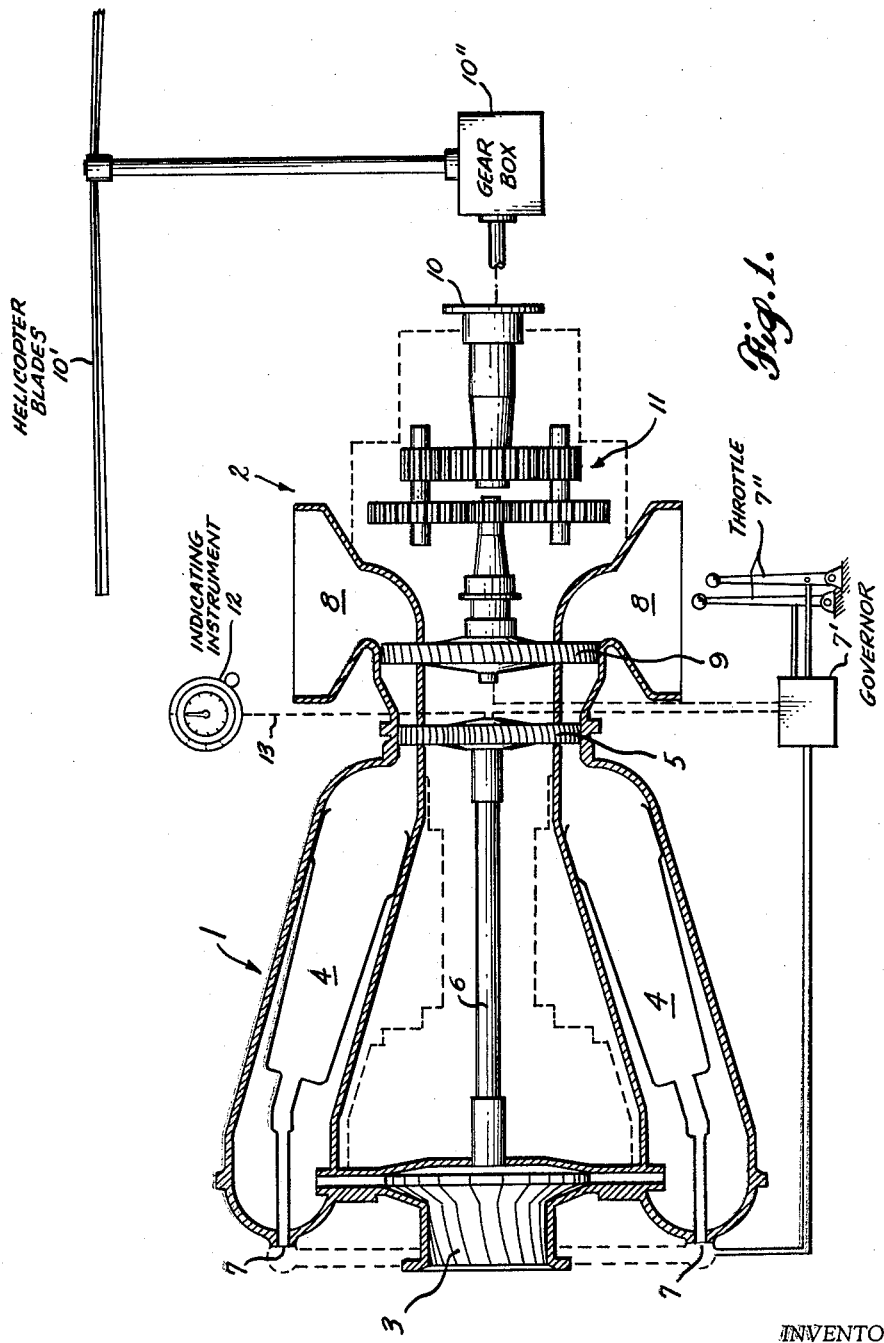
FIG. 1 shows a longitudinal cross-section of a split-shaft gas turbine engine wherein the gas producer section is operatively connected with the instrument of the invention and the power producer section is connected to a load such as helicopter rotor blades.

A typical split-shaft gas turbine engine as shown in FIG. 1 consists of two main sections: a gas producer section 1 which burns the fuel to form the impelling gaseous mixture, and a power producer section 2 which receives the impact of the impelling gaseous mixture to turn the output shaft for driving a load.

Gas producer section 1 includes a compressor 3, burners 4, and a turbine 5 which is operatively connected to compressor 3 by shaft 6, the burners 4 having air inlets connected to compressor 3 and exhaust gas outlets connected with turbine 5 and being provided with fuel supply means 7, said fuel supply means including governor 7' and throttle 7". Power producer section 2 includes an exhaust outlet 8 operatively connected with burners 4, a turbine 9, and power output shaft 10 connected to turbine 9 by reduction gearing generally indicated at 11, said output shaft 10 being operatively connected with helicopter rotor blades 10' via gear box 10" as indicated schematically in FIG. 1.

As well known, the air and fuel supplied to gas producer section 1 determines the gaseous mixture supplied to power producer section 2 and the power developed thereby, and since the operation of a split-shaft gas turbine engine is known an explanation thereof is deemed unnecessary.

Figure 2:
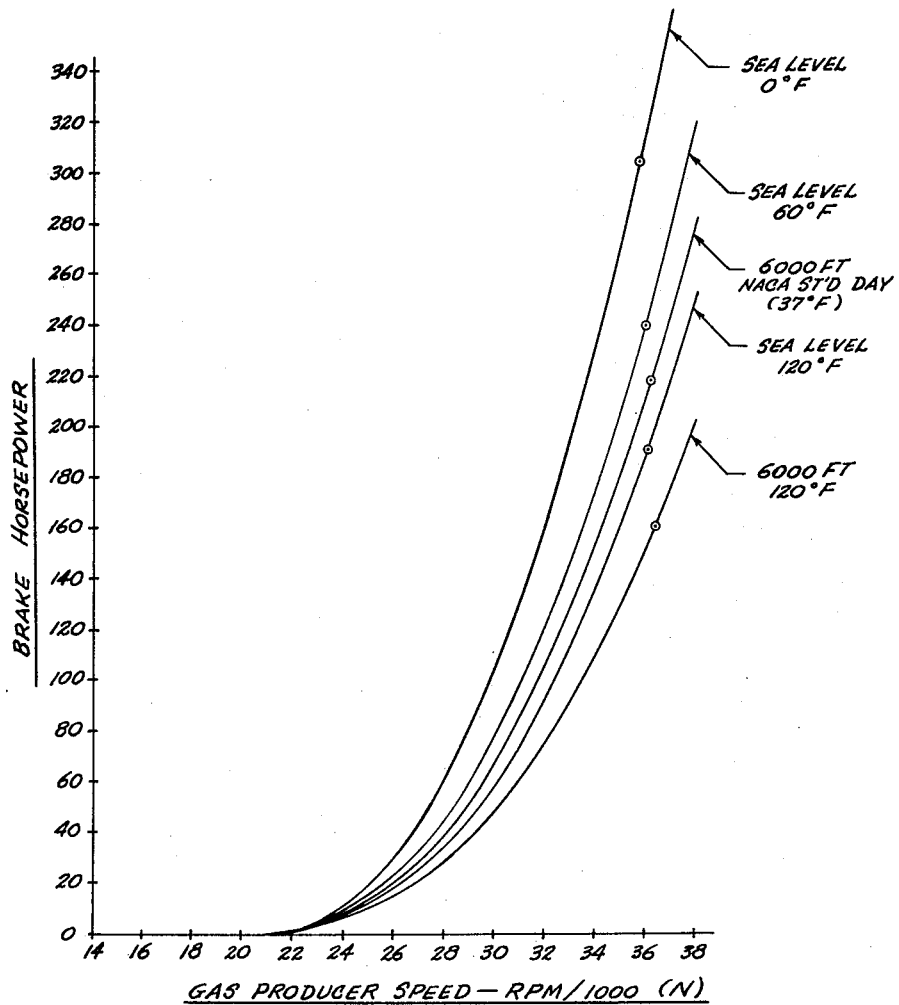
FIG. 2 is a graph showing the performance curves of a typical split-shaft gas turbine engine in which the brake horsepower is plotted against the gas producer speed when operated under different atmospheric conditions.

FIG. 2 shows the performance curves of a typical split-shaft gas turbine engine. The brake horsepower (the power produced by output shaft 10) is plotted against the rotational speed of shaft 6 of gas producer section 1. The power shaft 10, in this particular engine, when rotating at a constant speed of 3,200 r.p.m. develops no horsepower until the gas producer section 1 begins to rotate over 20,000 r.p.m. This is because the gas producer section does not produce enough energy to keep its own compressor 3 rotating until it reaches speeds of over 20,000 r.p.m. At increased altitudes and temperatures, less horsepower is developed by the engine at a given gas producer speed because the air is less dense and compressor 3 is able to impel less air to burner 4 so that less fuel is consumed. In the particular split-shaft gas turbine engine, for which these curves are drawn, the governor is designed to limit the rotational speed of gas producer section 1 to about 36,000 r.p.m. However, there is a certain "droop" in the governor so that the fuel feed is not cut off sharply at 36,000 r.p.m. At lower operating horsepower, where relatively less fuel is consumed, the maximum speed of gas producer section 1 is slightly more than 36,000 r.p.m. At higher operating horsepower, where more fuel is consumed, the maximum speed of the gas producer section is slightly less than 36,000 r.p.m. These cut off points are shown on the graph of FIG. 2 as small circles on the curves. These small circles designate the maximum gas producer r.p.m. and maximum brake horsepower which the governor will allow for that particular altitude and temperature. The air pressure and air density vary with the altitude, so the atmospheric characteristics are here referred to as altitude and temperature. Since the power output shaft 10 is rotating at a constant speed of 3,200 r.p.m., the change in power output is related directly to the increased torque load on output shaft 10.

Figure 3:
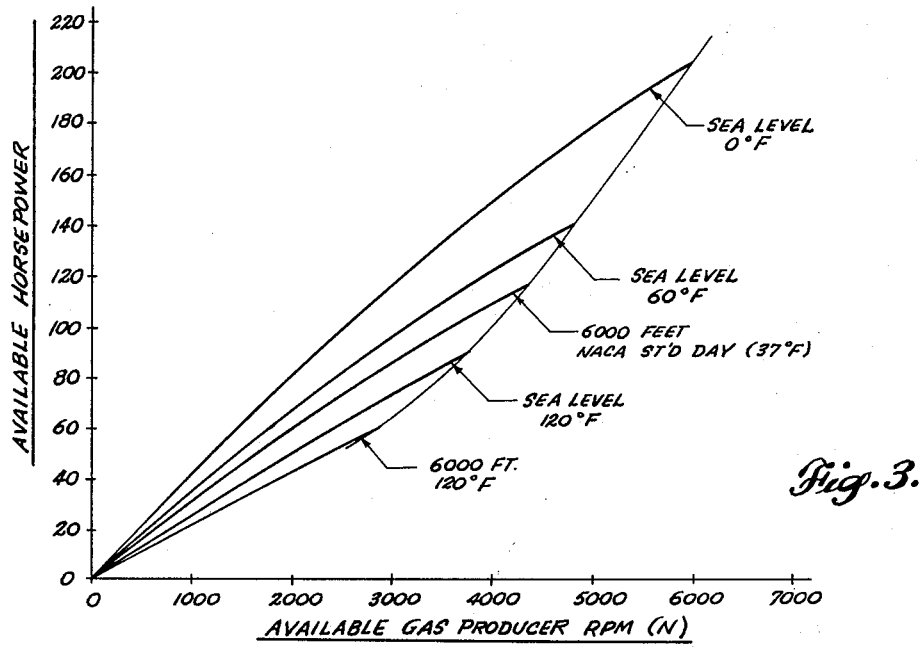
FIG. 3 is a graph derived from the values of the FIG. 2 graph and showing the available power as plotted against the available increase in gas producer speed.

The graph of FIG. 3 is derived directly from the graph of FIG. 2. As stated above, the speed of power output shaft 10 is a constant 3,200 r.p.m. However, instead of plotting the actual horsepower output of the engine, the available horsepower is plotted along the Y-axis. The available horsepower in the operation of a helicopter, for example, is the difference between that required to hold the helicopter in hover position and that which can be produced by increasing the speed of the gas producer to maximum. Along the X-axis the available increase of gas producer r.p.m. is plotted. The available gas producer r.p.m. is the difference between the maximum speed of the gas producer when operating in a helicopter and the minimum speed of the gas producer required to maintain the helicopter in hover position. To show the relationship betweens FIGS. 2 and 3, the following example is given. If the gas producer speed is 32,000 r.p.m. at sea level and 60° F. there would be approximately 120 brake horsepower developed (see FIG. 2). Now if the gas producer r.p.m. is increased to 36,000 the brake horsepower will be 240, a gain or 120 horsepower (see FIG. 2). Thus with an increase of 4,000 r.p.m. (available r.p.m.) FIG. 3 shows on increase of 120 horsepower (available horsepower) for the same atmospheric conditions.

In FIG. 3, if the increase in available horsepower and available r.p.m. of the gas producer is zero, the split-shaft gas turbine engine is operating at full horsepower and the gas producer section is rotating at maximum speed. It can readily be seen from the FIG. 3 graph that at higher temperatures and at higher altitudes, there is less horsepower available for the same amount of available increase in gas producer r.p.m. For example, at sea level and zero degrees Fahrenheit, when the gas producer section 1 is operating at 2,000 r.p.m. below maximum speed, the engine power output may be increased by 80 horsepower when the gas producer speed is increased to maximum. However, at 6,000 feet above sea level and at 120 degrees F., when the gas producer is operating at 2,000 r.p.m. below maximum speed, the available increase in engine power output is only 40 horsepower when the speed of the gas producer is increased to maximum.

Figure 4:
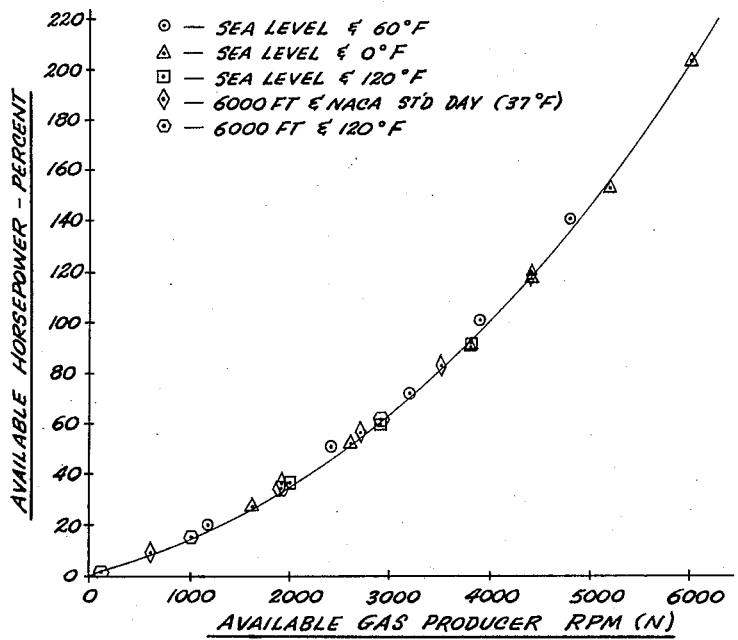
FIG. 4 is a graph showing the percentage of power available as plotted against the available increase of gas producer speed.

The graph of FIG. 4 shows the relationship between the power output of power producer section 2 engine and the available rotational speed of gas producer section 1. The values plotted on the Y-axis are the percentages of power available. The horsepower available is divided by the amount of horsepower that the engine is producing, which gives the values in percentage of power available. Along the X-axis is plotted the gas producer r.p.m. that is *available* by operating the gas producer at maximum speed. The values on the graph are plotted for various conditions of temperature and altitude, as indicated on the graph, at different speeds of the gas producer section. All these points fall closely on the same curve. Therefore, the percentage of power available is substantially a function of the gas producer r.p.m. available. From this graph it is possible to ascertain the percentage of available increase in power if the amount of available increase in gas producer r.p.m. is known, regardless of whether the engine is operating at sea level or at 6,000 feet above sea level, or at zero degrees Fahrenheit or at 120 degrees Fahrenheit. Therefore, from this graph, it would be possible to calculate the available horsepower in the engine, provided the present horsepower output, the present gas producer speed, and the maximum possible gas producer speed are known.

Figure 5:
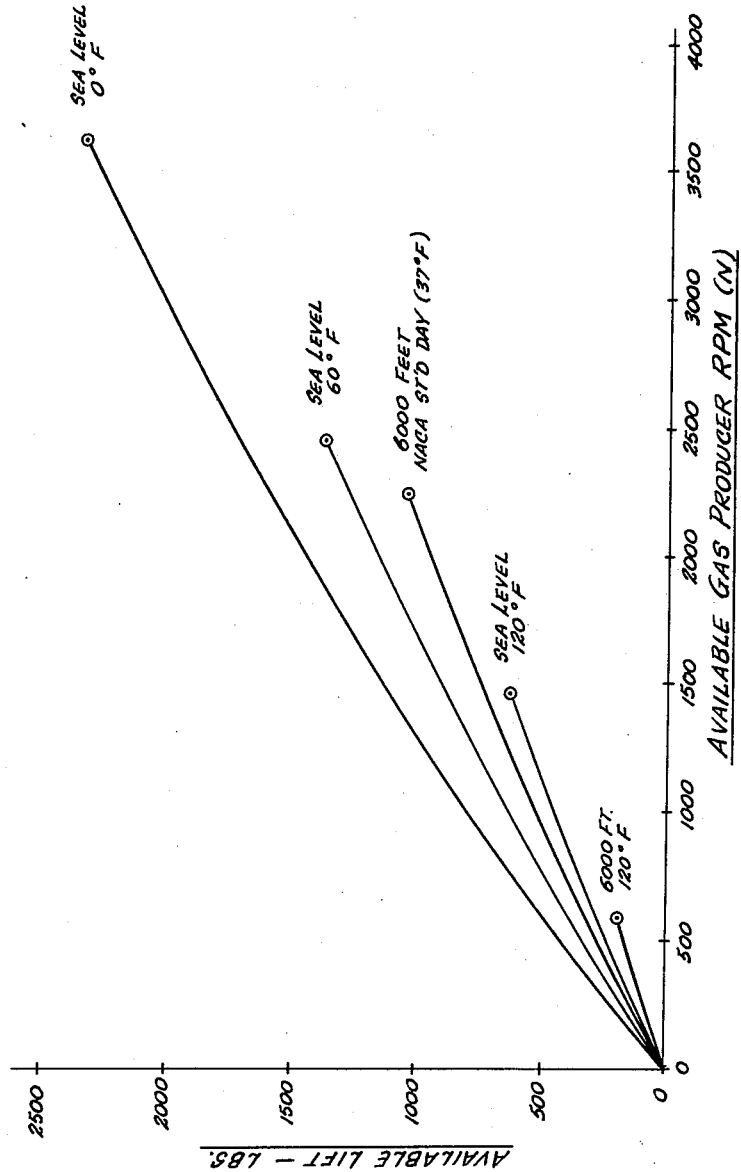
FIG. 5 shows the characteristic curves of a typical split-shaft gas turbine engine used to power a helicopter in which the available lift in pounds is plotted against the necessary increase in gas producer r.p.m. to produce the lifting force.

Referring now to the characteristic of a split-shaft gas turbine engine which powers a helicopter rotor, the FIG. 5 graph shows the curves of a typical spilt-shaft gas turbine used in a helicopter. In the example herein described, the power output shaft 10 rotates and the connected turbine rotor rotates at the same speed ratio to one another at all times. The lifting force of the helicopter is increased by changing the pitch of the rotor blades, but not the speed. On the Y-axis of the FIG. 5 graph are plotted the load values which a helicopter can lift over and above its own weight. On the X-axis of the graph is plotted the gas producer speed (N) available above the gas producer speed required for hovering the helicopter as presently loaded. Therefore, at zero available lift and at zero available N, the gas producer is rotating at the minimum speed required for helicopter hover for the particular altitude (air pressure and air density) and temperature existing at that moment. For the same helicopter at higher altitudes and at higher temperatures, the gas producer speed must be higher to make the helicopter hover. Therefore, at high temperature and at high altitude the zero point on the X-axis will correspond to a higher gas producer r.p.m., and at lower altitudes and at lower temperatures the zero point on the X-axis will correspond to a lower value of the gas producer speed. Since, in the graph of FIG. 5, the weight of the helicopter does not vary, the zero point on the Y-axis indicates that the helicopter is supporting its own weight for all the curves on the graph. It can be readily seen that the lift characteristics vary greatly with varying altitudes and temperatures.

Figure 6:
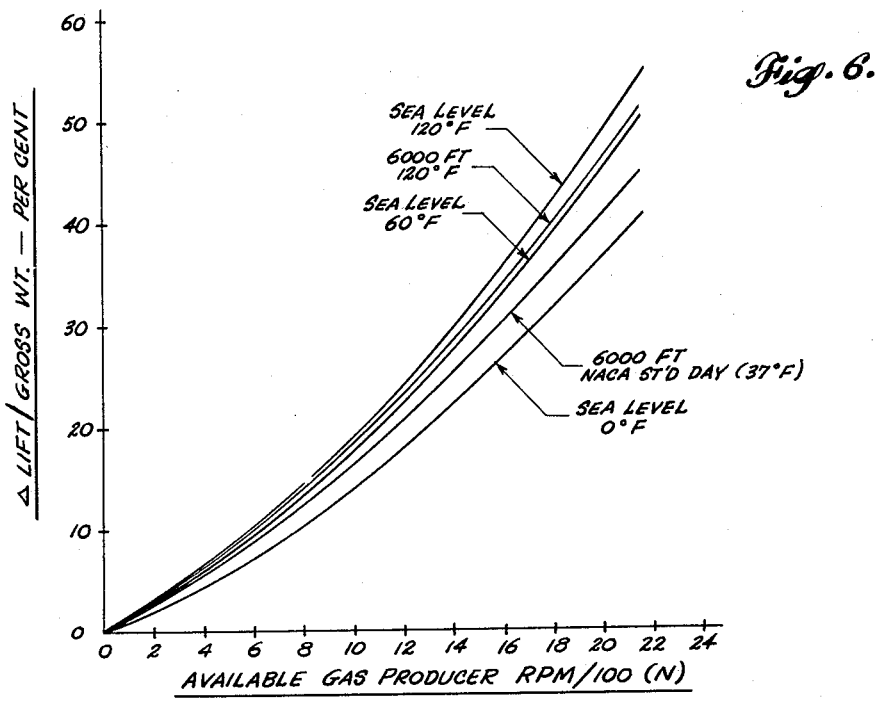
FIG. 6 is a graph showing characteristic curves of a split-shaft gas turbine engine used in a helicopter in which the percentage of lifting force available is plotted against the gas producer r.p.m. available.

In the FIG. 6 graph, the available increase of gas producer r.p.m. (N) in units of 100 is plotted on the X-axis. Therefore, for example at an $N=0$ value of available gas producer r.p.m. on the X-axis corresponds to a maximum gas producer r.p.m., or an $N=6$ value on the X-axis corresponds to a gas producer speed which is 600 r.p.m. below maximum speed. On the Y-axis are plotted values of the available percentage of increase of lift. This percentage is calculated by finding the amount of lifting force yet available if the engine were to be operated at full power and dividing this value by the lifting force which the engine is exerting at that particular gas producer r.p.m. For example, if the engine is supporting 2,000 pounds and a lifting force of 1,200 pounds is yet available the percentage would be 60%. As shown in FIG. 6, these characteristic curves vary as the temperature and altitude vary. The values do not fall as closely on one line as the values of the FIG. 4 graph, however, it is possible to draw a compromise curve which will substantially approximate all the characteristic curves which exist for various altitudes and temperatures. For example, the percentage of lift available for a compromise altitude and temperature condition with a gas producer speed which is 1800 r.p.m. below its maximum speed would be approximately 38%. Therefore, it can be said that the change in percentage of lift available to the helicopter is substantially a function of the available increase in gas producer r.p.m. and consequently is a function of the percentage of power available since the percentage of power available is also a function of the gas producer r.p.m.

The graph of FIG. 4 may be plotted almost directly from the experimental data which is the basis for the characteristic engine performance curves of a split-shaft gas turbine engine. The graph of FIG. 6 may also be obtained almost directly from experimental data or may be derived or checked theoretically from empirical values on the graph of FIG. 4 and by using the standard lift formula for helicopters as follows:

$$\frac{P}{W} = \frac{\sigma\delta}{8}\frac{(\rho)}{(\omega)}\Omega^3 R^3 + \sqrt{\frac{\omega}{2\rho}}$$

wherein:

$P$ = Power: Ft.-lb./sec.
$W$ = Gross weight: lbs.
$\sigma$ = Rotor solidity: Ratio of blade area to disc. area
$\delta$ = Profile drag coefficient
$\rho$ = Density of air: 0.992378 lbs.-sec.$^2$/ft.$^4$
$\omega$ = Disc loading: lbs./ft.$^2$
$\Omega$ = Rotor speed: Rad./sec.
$R$ = Blade radius: Ft.
$A$ = Disc area: Ft.$^2$ As shown in FIG 1, shaft 6 of gas producer section 1 is drivingly connected to an indicating instrument generally indicated at 12 by drive means 13. Instrument 12 includes a portion which basically functions like a tachometer to indicate the speed of gas producer section 1, the details of different embodiments of the instrument being described hereinafter.

Figure 7:
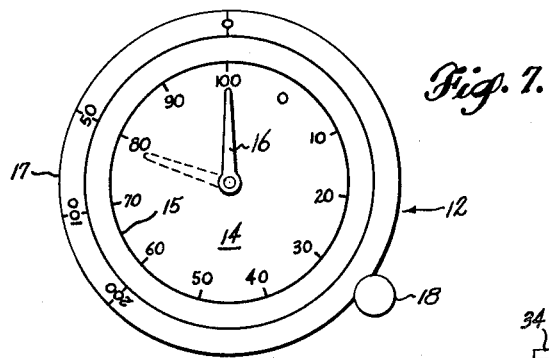
FIGS. 7–9 show different embodiments of apparatus for carrying of the invention.

Referring to FIG. 7 which shows one embodiment of the invention, the indicating instrument 12 comprises a tachometer 14 which has a dial face 15 upon which is inscribed in a clockwise direction numerical values from 1 to 100, an indicator needle 16 rotatably mounted with respect to dial face 15 and drivingly connected to gas producer section 1 by drive means 13, whereby said indicator needle 16 is responsive to the speed of the gas producer. The tachometer dial face 15 is calibrated with respect to the gas producer so that movement of needle 16 indicates the gas producer r.p.m. in percentage values.

Fitted around the outside perimeter of dial face 15 is a movable scale 17 upon which are displayed in a counter clockwise direction numerical values indicating the percentage of power available. Scale 17 is movable by a set knob 18 along the perimeter of dial face 15, and the numerical values on scale 17 extend along the perimeter of dial face 15, so that as needle 16 indicates a tachometer reading on dial face 15, needle 16 also indicates a numerical value of percentage of power available on scale 17.

When the device shown in FIG. 7 is used in a helicopter which is powered by a split-shaft gas turbine engine, the mode of operation this embodiment of the invention is as follows: at the location where the lift is to be made, the pilot opens the throttle so that the gas producer section 1 reaches its maximum r.p.m. Scale 17 is then set so that the zero point thereof corresponds to the maximum gas producer speed then obtained as indicated by needle 16 and shown in solid lines in FIG. 7. The throttle is then moved toward closed position to a point where the helicopter will just maintain its hover position, needle 16 indicating the speed of the gas producer section at hover. At this position, needle 16 also points to a percentage value on scale 17, this value indicating the additional weight the helicopter may lift in terms of percent of the then total weight of the helicopter. By multiplying the weight of the helicopted in pounds by the percentage reading on scale 17 the pilot is able to obtain the available lifting force in pounds.

The device of FIG. 7 need not be limited to use in a helicopter. Also, not only the percentage of power available can be shown by the numerical values on scale 17, but any values functionally related to the percentage of power available may be utilized.

To show another practical use of the FIG. 7 embodiment, assume that the gas turbine engine is used to drive a fluid pump. Also assume that the flow of fluid is functionally related to the percentage of power available, and it is desirable to increase the fluid flow by a certain amount. The device would then be adapted so that the numerical values on scale 17 would indicate the percentage of flow increase available. If the actual gas producer speed and the maximum possible gas producer speed are known, it may be readily determined from the device what percentage of flow increase is available for a given gas producer speed. The zero point on scale 17 woudl indicate no available increase in flow and would be set at a position on dial face 15 where needle 16 points at the maximum gas producer r.p.m. Then the other values of fluid flow may be calculated for lesser values of gas producer r.p.m. by means of the numerical values on scale 17. For example, if it is known that at maximum gas producer r.p.m. the flow is 100 gallons per minute, at an r.p.m. where there is 50% available increase of fluid flow, the flow would be 66⅔ gallons per minute.

From this example it can be seen that there could be a wide latitude in the values expressed by the numerical values on scale 17.

While the FIG. 7 device has been described with respect to a split-shaft gas turbine engine, it is operable in any system wherein the power plant is of the type where the percentage of power available is substantially a function of the change of the speed of the propulsive energy producer. In this type of engine, the additional power output obtainable for a given increase in the gas producer speed may vary greatly depending upon the ambient air temperature, pressure, and density. The device has great utility in engine applications wherein the gas producer section can be increased to maximum speed with substantially little change in the speed or load of the power producer section due to the type of load imposed on the power producer.

The tachometer 14 is a means to indicate the instantaneous speed of the gas producer in revolutions per minute for the altitude and temperature conditions then present. The scale 17, in cooperation with tachometer 14, is a means to indicate a value related to the percentage of available increase of power. Since, as shown in the FIG. 4 graph, the percentage of available increase in power is functionally related to the gas producer r.p.m. or to a change in gas producer r.p.m., it is apparent from the operation of the device of FIG. 7, in which the difference between the maximum r.p.m. and a lesser r.p.m. is determined, that the tachometer is a means to produce a value related to the difference of the maximum speed and a lower speed of the gas producer, and that scale 17 is a means to indicate a value related to the percentage of power available at the lower speed. From this, it is apparent that the value which is related to the gas producer speed available need not be a visual reading of r.p.m. as shown in FIG. 7, but may correspond to any value such as an electrical voltage, light intensity, velocity, linear or angular displacement, etc., so long as this value is functionally related to the available gas producer speed. Likewise, the numerical values on scale 17 indicating the percentage of power available may also be terms of linear or angular displacement, voltage, current, light intensity, etc. The values of scale 17 may correspond to other values which are functionally related to the percentage of power available such as the actual power available, a lift value, velocity, acceleration, or any value associated with the output of the gas turbine engine, and which is functionally related to the available power output of the engine. The following embodiments will illustrate other methods and apparatus for practicing the invention.

Figure 8:
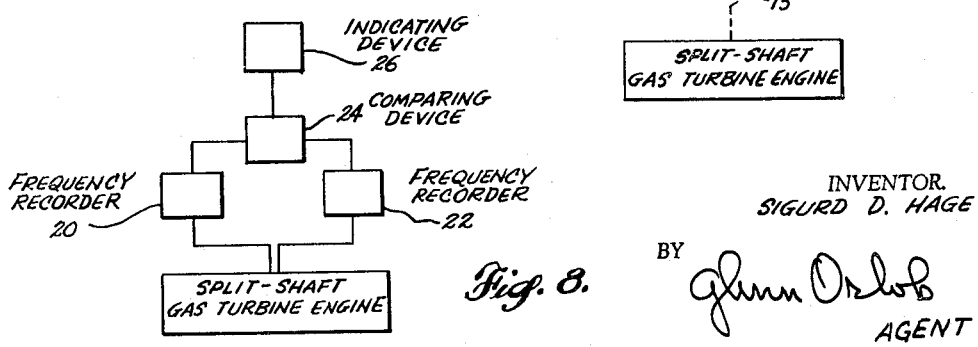

FIG. 8 is a schematic drawing in which the frequencies produced by the gas producer section 1 are related so as to indicate a value related to a change in gas producer speed which in turn indicates a value related to the percentage of power available. The frequencies produced by the gas producer may be acoustic, mechanical or electrical, or may be any other frequency which may be related to the gas producer speed. The embodiment comprises a frequency recorder 20 whose function is to create a value functionally related to a frequency which is related to a lower gas producer speed, a second frequency recorder 22 whose function is to indicate a value related to a higher or the maximum gas producer speed. Associated with recording devices 20 and 22 is a comparing device 24 whose function is to produce a value functionally related to the difference between the values produced by frequency recorders 20 and 22. Associated with comparing device 24 is an indicating device 26 whose function is to indicate values related to the percentage of available power of the engine. It is not necessary that recording devices 20 and 22, comparing device 24, and indicating device 26 be actually associated with one another either electrically, acoustically, mechanically, or in some other physical way. It is possible to obtain values from these devices separately, and manually relate the obtained values one to the other to obtain the desired value from the indicating device 26.

Figure 9:
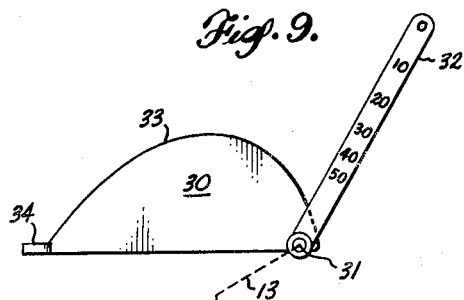

The FIG. 9 embodiment operates on a rotating cam principle. A plate 30 is rotatably mounted on a pin 31 and drivingly connected to the gas producer section of a split-shaft gas turbine engine by means responsive to speed such as drive means 13 as in the FIG. 7 device. Pivotally mounted on pin 31 is a scale 32 inscribed with numerical values which indicate values related to the percentage of power available. The perimeter of plate 30 is shaped to form a cam line 33 whose distance from pin 31 varies in cooperation with the numerical values on scale 32 according to the functional relationship of the gas producer speed to the percentage of power available. The plate 30 is associated with gas producer section 1 of the engine so that as the gas producer speed increases plate 30 rotates clockwise, and as the gas producer speed decreases plate 30 rotates counter clockwise. Scale 32 is functionally mounted on pin 31 so that as plate 30 rotates clockwise a jutting portion 34 of plate 30 engages scale 32 and pivots it clockwise, but as plate 30 rotates counter clockwise scale 32 does not move. The numerical values are so printed on scale 32, and the cam line 33 of plate 30 is so shaped in relation to the numerical values on scale 32, that there is a functional relationship between the numerical values and cam line 33. This functional relationship is such that when plate 30 assumes its position which corresponds to the maximum gas producer speed, i.e., when plate 30 has rotated clockwise to its furthest point, the scale 32 is thereby positioned so that the zero mark of the numerical value rest on cam line 33 of plate 30, and when afterwards, plate 30 rotates counter clockwise because of a reduction in gas producer speed, leaving scale 32 in the position it assumed at maximum gas producer speed, the cam line 33 will cross scale 32 at a point to indicate a value on scale 32 which is functionally related to the percentage of power available at that lower gas producer speed. This functional relationship is such that this value on scale 32 is also functionally related to the gas producer speed. The FIG. 9 device thus operates in much the same manner as the FIG. 7 embodiment.

It has thus been shown that the invention provides a quick and accurate method and apparatus for ascertaining the available power of an engine during any operation conditions.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim is:

1. A method of determining the percentage of power available in a split-shaft gas turbine engine having a known relationship between percentage power available and available gas producer speed comprising the steps of determining the maximum speed of the gas producer under the existing altitude and temperature conditions, determining the speed of the gas producer required to handle an existing load thereon, determining the available increase in gas producer speed by measuring the difference between the maximum speed of the gas producer and the speed required to handle the existing load thereon, and determining the percentage of power available from the known relationship between available gas producer speed and percentage power available.

2. A method of determining the percentage of lift available to a helicopter powered by a split-shaft gas turbine engine, said helicopter having a known relationship between percentage of lift available and gas producer speed available, comprising the steps of determining the maximum speed of the gas producer under the existing ambient atmospheric temperature, pressure and density conditions, determining the minimum speed of the gas producer required to maintain the helicopter in a hovering position under the existing atmospheric conditions, determining the available increase in gas producer speed by measuring the difference between the maximum speed of the gas producer and the speed required to maintain the helicopter in a hovering position and determining the percentage of lift available to the helicopter under the existing atmospheric conditions from the known relationship between percentage of lift available and gas producer speed available.

3. In a helicopter powered by a gas turbine engine having a gas producer portion and a power producer portion, means for determining the percentage of lift available over the lift required to maintain the helicopter in hover position comprising: a tachometer calibrated to indicate a value related to the speed of an engine gas producer portion at the existing atmospheric conditions, and including an adjustable means operatively connected to the calibrations to indicate the percentage lift available.

4. A method of determining the lift available to a helicopter powered by a split-shaft gas turbine engine over that required to maintain the helicopter in hover position under the existing ambient atmospheric conditions comprising the steps of increasing the speed of the engine gas producer portion to a maximum, recording this maximum speed, decreasing the speed of the engine gas producer portion to a minimum speed sufficient to maintain the helicopter in hover position, recording this minimum speed, and comparing the difference between the two speeds with a scale calibrated to indicate the available lift.

5. In a helicopter powered by a gas turbine engine having a gas producer portion and a power output portion, mechanism for determining the power available over that required to sustain the existing load on the engine under the existing atmospheric conditions comprising: a tachometer means having an indicator needle responsive to the speed of the gas producer, a dial face calibrated in terms of percentage of gas producer speed, and a ring means calibrated in terms of percentage of power available, said ring means being adjacent to and adjustable with respect to the dial face.

References Cited by the Examiner
UNITED STATES PATENTS

| | | |
|---|---|---|
| 2,174,608 | 10/39 | Vail. |
| 2,663,186 | 12/53 | Nieburg _____ 73—116 X |
| 2,854,818 | 10/58 | Fortmann et al. |
| 2,975,633 | 3/61 | Hautzenroeder _____ 73—116 |
| 2,995,929 | 8/61 | Lindquist _____ 73—116 |
| 3,124,931 | 3/64 | Mock _____ 60—39.16 X |

RICHARD C. QUEISSER, *Primary Examiner.*

DAVID SCHONBERG, *Examiner.*